United States Patent
Gyobu et al.

(12)

(10) Patent No.: US 6,242,560 B1
(45) Date of Patent: *Jun. 5, 2001

(54) THERMOPLASTIC POLYESTER ELASTOMER AND COMPOSITION COMPRISING THE SAME

(75) Inventors: Shoichi Gyobu; Koji Kobayashi; Hiroaki Taguchi, all of Otsu; Yoshio Araki, Iwakuni; Hidetaka Miyaji; Seiji Nakayama, both of Otsu, all of (JP)

(73) Assignee: Toyo Boseki Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,308

(22) Filed: Oct. 5, 1998

(30) Foreign Application Priority Data

Oct. 6, 1997 (JP) .................................................. 9-272979

(51) Int. Cl.⁷ .................................................. C08G 64/00
(52) U.S. Cl. ........................... 528/272; 528/176; 528/271
(58) Field of Search .................................. 528/176, 271, 528/272, 301

(56) References Cited

U.S. PATENT DOCUMENTS 4,195,000  3/1980  Charles et al. ......................... 528/176

FOREIGN PATENT DOCUMENTS

| | | |
|---|---|---|
| 2904184A | 10/1979 | (DE) . |
| 4401568 | 7/1995 | (DE) . |
| 73004116B | 2/1973 | (JP) . |
| 7401558B | 8/1974 | (JP) . |
| 59-12926 | 1/1984 | (JP) . |
| 59-157117 | 9/1984 | (JP) . |

OTHER PUBLICATIONS

Chemical Abstracts, vol. 94, No. 6, Feb. 9, 1981, Columbus, Ohio, US; abstract No. 36383, XP002102580 & JP 55 101268 A (Toyobo Co., LTD.), Aug. 1, 1980.

Database WPI, Derwent Publications Ltd., London, GB; AN 93–285473 XP002102582 & JP 05 202176 A (Nippon Ester CO.), Aug. 10, 1993.

Chemical Abstracts, vol. 125, No. 16, Oct. 14, 1996, Columbus, Ohio, US; abstract No. 196770, XP002102581 & JP 08 157583 A (Mitsubishi Rayon), Jun. 18, 1996.

Patent Abstracts of Japan, vol. 018, No. 427 (C–1235), Aug. 10, 1994 & JP 06 128363 A (Toyobo CO., LTD.), May 10, 1994.

Database WPI, Derwent Publications Ltd., London, GB; AN 75–04978W XP002102583 & JP 49 048195 B (Toyo Spinning CO., LTD.).

J.R. Wolfe, Jr., "Elastomer Polyether–Ester Block Copolymers, Properties as a Function of the Structure and Concentration of the Ester Group," American Chemical Society, 1979, pp. 129–151.

*Primary Examiner*—Terressa M. Boykin
(74) *Attorney, Agent, or Firm*—Kenyon & Kenyon

(57) ABSTRACT

A thermoplastic polyester elastomer having a crystalline melting point which satisfies the relationship: $y \geq 200+0.5x$, a Vicat softening point which satisfies the relationship: $z \geq 50+1.5x$, and a tensile elongation of at least 100% which is measured according to JIS K 6251, in which x is a weight percentage of polymeric units which substantially constitute hard segments of the elastomer; y is a crystalline melting point (°C.); and z is a Vicat softening point (°C.), which elastomer has a high melting point, while it has good heat resistance, water resistance and weather resistance.

7 Claims, No Drawings

THERMOPLASTIC POLYESTER ELASTOMER AND COMPOSITION COMPRISING THE SAME

BACKGROUND OF THE INVENTION

1. Field of the Invention

The present invention relates to a thermoplastic polyester elastomer and a composition comprising the same. More particularly, the present invention relates to a thermoplastic polyester elastomer which has a high melting point and good water resistance, weather resistance and heat resistance, and a composition comprising the same.

The thermoplastic polyester elastomer of the present invention can be used for the production of various shaped products such as fiber, films, sheets and the like. In particular, it is suitable as a molding material for boots, gears, tubes and the like, and it is useful in applications which require heat resistance, for example, automobiles, electric home appliances, etc. such as joint boots, coatings of electric wires, and the like.

2. Prior Art

Conventional thermoplastic polyester elastomers include a polyetherester elastomer comprising hard segments of polybutylene terephthalate (PBT) and soft segments of polytetramethylene glycol (PTMG) (see JP-B-49-48195 and JP-B-49-31558), a polyesterester elastomer comprising hard segments of PBT and soft segments of polycaprolactone (PCL) (see JP-B-48-4116, JP-A-59-12926 and JP-A-59-1517), a polyesterester elastomer comprising hard segments of PBT and soft segments of dimer fatty acids (see JP-A-54-127955), and the like, and these thermoplastic elastomers are practically used.

When the hard segments comprise PBT, the melting point of elastomers does not exceed 230° C., since the melting point of PBT is less than 230° C. To improve this drawback of the conventional elastomers comprising hard segments of PBT, elastomers are proposed, which comprise hard segments of polyethylene naphthalate or polycyclohexanedimethylene terephthalate having a high melting point (see JP-A-5-202176). However, the content of the hard segments should be 60 wt. % or less from the viewpoint of elastic properties of the elastomers, since soft segments comprise polytetramethylene glycol, and elastomers having a high melting point of 230° C. or higher have not been produced.

SUMMARY OF THE INVENTION

One object of the present invention is to provide a thermoplastic polyester elastomer having a high melting point and also good water resistance, weather resistance and heat resistance.

The term "high melting point" used herein will be explained.

In general, the melting or softening point of an elastomer increases, as the content of hard segments increases, and an elastic modulus increases. Thus, the increase of an elastic modulus can lead to the increase of a melting or softening point. However, an elastomer having a high elastic modulus has a high glass transition temperature and cannot exhibit good elastic properties, since it contains an increased amount of hard segments. The present invention intends to suppress the excessive increase of the elastic modulus and the glass transition temperature of an elastomer while achieving the high melting point of the elastomer. That is, in the present invention, an elastomer having a high melting point means an elastomer having a sufficiently high melting point although it has an elastic modulus in the same level as that of elastomers having a relatively low melting point. That is, one object of the present invention is to provide an elastomer having a high melting point in such a sense.

Accordingly, the present invention provides a thermoplastic polyester elastomer having a crystalline melting point which satisfies the relationship of the following formula (1), a Vicat softening point which satisfies the relationship of the following formula (2), and a tensile elongation of at least 100% which is measured according to JIS K 6251:

$$\text{Crystalline melting point: } y \geq 200+0.5x \quad (1)$$

$$\text{Vicat softening point: } z \geq 50+1.5x \quad (2)$$

in which x is a weight percentage of polymeric units which substantially constitute hard segments of the elastomer;

y is a crystalline melting point (°C.) measured with a differential scanning calorimeter (DSC) by raising a temperature from a room temperature at a heating rate of 20° C./min.; and z is a Vicat softening point (°C.) measured according to ASTM D1525.

In one preferable embodiment, the crystalline melting point y satisfies the relationship of the formula:

$$y \geq 200+0.55x \quad (1')$$

more preferably $$y \geq 200+0.6x \quad (1'')$$

In another preferable embodiment, the Vicat softening point z satisfies the relationship of the formula:

$$z \geq 50+1.7x \quad (2')$$

more preferably $$z \geq 70+1.7x \quad (2'')$$

When the relationships of the formulas (1) and (2) are not met, the elastomer has insufficient heat resistance, and thus cannot be used in applications which require heat resistance, for example, automobiles, electric home appliances, etc.

In principle, a Vicat softening point is measured according to ASTM D1525. Depending on the shape of a sample, a Vicat softening point may be defined by a softening point which is measured in an analogous method to ASTM D1525. For example, a temperature at which a storage modulus (E'), that is measured with a dynamic viscoelastometer, starts to decrease, or an extrapolated melt-starting temperature according to JIS K 7121 may be used as a softening point. In this application, a temperature at which a storage modulus (E') starts to decrease in the measurement of dynamic viscoelasticity is used as a substitute for a Vicat softening point.

Here, a softening point is determined by measuring a storage modulus in the measurement of dynamic viscoelasticity using a RHEOVIBRON DDV-II (manufactured by TOYO BOLDWIN) with a sample having a thickness of from 100 to 500 μm at a heating rate of 2° C./min. and a frequency of 110 Hz.

Furthermore, the present invention provides a thermoplastic polyester elastomer comprising repeating units of the general formulas (I), (II), (III) and (IV):

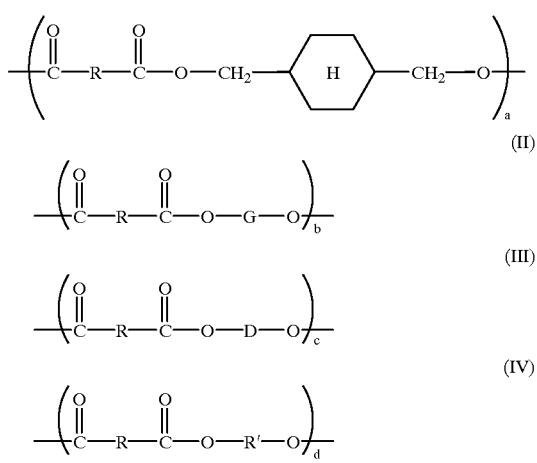

wherein
- R is an aromatic group having 6 to 18 carbon atoms, provided that the R groups in the general formulas (I), (II), (III) and (IV) may be the same or different;
- G is a polyoxyalkylene group having a molecular weight of from 400 to 6000;
- D is a residue of a hydrogenated dimer diol or its derivative;
- R' is an alkylene group having 1 to 25 carbon atoms;
- a, b and c represent weight percentages of the respective repeating units in the whole polymer, provided that a is from 30 to 95 wt. %, and the ratio of b to the sum of b and c is from 0.01:1 to 0.99:1; and
- d is a molar percentage in the whole polymer and from 0 to 20 mole %.

Furthermore, the present invention provides a composition comprising the above thermoplastic polyester elastomer of the present invention, and at least one additive selected from the group consisting of antioxidants, light stabilizers, lubricants, fillers, compounds having at least one epoxy group, compounds having a phenyl group which is substituted with at least one halogen atom, flame retarding aids, and compounds having a triazine group and derivatives thereof.

DETAILED DESCRIPTION OF THE INVENTION

The thermoplastic polyester elastomer of the present invention should satisfy the relationships of the above two formulas (1) and (2).

To this end, the acid component constituting the repeating units of the above general formulas (I), (II), (III) and (IV) comprises at least one aromatic dicarboxylic acid. Preferable examples of the aromatic dicarboxylic acid include terephthalic acid, naphthalenedicarboxylic acid, diphenyldicarboxylic acid, isophthalic acid, 5-sodiumsulfoisophthalic acid, and the like. They may be used singly or in combination of two or more. The proportion of the aromatic dicarboxylic acid to the whole acid component is usually at least 70 mole %, preferably at least 80 mole %.

Examples of acid components other than the aromatic dicarboxylic acid are alicyclic dicarboxylic acids, aliphatic dicarboxylic acids. Specific examples of the alicyclic dicarboxylic acid are cyclohexanedicarboxylic acid, tetrahydrophthalic anhydride, etc., and specific examples of the aliphatic dicarboxylic acid are succinic acid, glutaric acid, adipic acid, azelaic acid, sebacic acid, dodecanedioic acid, dimer acids, hydrogenated dimer acids, etc. The other acid component is used in an amount such that the melting point of the elastomer is not significantly reduced. Thus, the proportion of the other acid component is usually less than 30 mole %, preferably less than 20 mole %.

The glycol component constituting the repeating units of the general formula (I) (hereinafter referred to as "ester units (I)") is 1,4-cyclohexanedimethanol. 1,4-Cyclohexanedimethanol has two isomers, that is, a cis isomer and a trans isomer. In this invention, 1,4-cyclohexanedimethanol having the large content of the trans isomer is preferable.

The proportion of the ester units (I) in the whole polymer is usually from 30 to 95 wt. %, preferably from 40 to 90 wt. %, more preferably from 50 to 85 wt. %. This value of the proportion corresponds to the value of x in the formula (1), and also the value of a in the general formula (I). When the proportion of the ester units (I) exceeds 95 wt. %, a polyester has decreased flexibility and an elastomer having good elastic properties cannot be obtained. When this proportion is less than 30 wt. %, the melting point of the elastomer decreases, and thus the heat resistance deteriorates.

The kind of the glycol component of the repeating units of the general formula (II) (hereinafter referred to as "ester units (II)") is not limited. Preferably, the glycol component of the ester units (II) is polyethylene glycol, polypropylene glycol, polytetramethylene glycol, and their derivatives which are terminated by ethylene oxide at both ends.

The molecular weight of polyalkylene glycol is usually from 400 to 6000, preferably from 800 to 3000, more preferably from 1000 to 2000. When the molecular weight is less than 400, the ester units (II) has insufficient elastic properties, and the obtained elastomer has decreased blocking properties, that is, hard segments having a sufficient length for exhibiting crystallinity cannot be obtained, and thus it has a decreased melting point or softening point. When the molecular weight exceeds 6000, the ester units (II) cause the phase-separation from other comonomer components during the polymerization, and thus the elastomer has insufficient elastic properties.

The kind of the hydrogenated dimer diol, which is a glycol component constituting the repeating units of the general formula (III) (hereinafter referred to as "ester units (III)"), is not limited. The hydrogenated dimer diols include a compound comprising at least 50 wt. % of a compound of the general formula (V) obtained by the hydrogenation of a dimer acid which is a dimer of an unsaturated fatty acid having 15 to 21 carbon atoms:

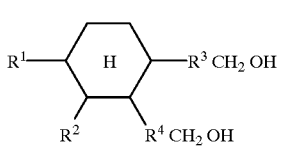

(V)

wherein $R^1$, $R^2$, $R^3$ and $R^4$ do not substantially include an unsaturated group and are substantially linear groups, and $R^1$ and $R^2$ represent independently from each other alkyl groups, and $R^3$ and $R^4$ represent independently from each other alkylene group, provided that the total number of the carbon atoms of $R^1$ to $R^4$ is from 22 to 34, or a mixture containing a compound of the general formula (V) and a compound of the general formula (VI):

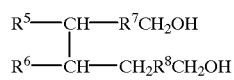
(VI)

wherein $R^5$, $R^6$, $R^7$ and $R^8$ do not substantially include an unsaturated group and are substantially linear groups, and $R^5$ and $R^6$ represent independently from each other alkyl groups, and $R^7$ and $R^8$ represent independently from each other alkylene group, provided that the total number of the carbon atoms of $R^5$ to $R^8$ is from 25 to 37.

The derivatives of the hydrogenated dimer diols mean any diol compounds which are derived from hydrogenated dimer diols. Specific examples of such derivatives include ethylene oxide and/or propylene oxide adducts of hydrogenated dimer diols. The oxides may be added to one or both of the molecular ends of the hydrogenated dimer diols. The amount of the oxide to be added is from one mole to twenty moles per one mole of the hydrogenated dimer diol.

The glycol component constituting the repeating units of the general formula (IV) (hereinafter referred to as "ester units (IV)") may be an alkylene glycol having 1 to 25 carbon atoms. Specific examples of the glycol include ethylene glycol, diethylene glycol, propylene glycol, 1,3-butanediol, 1,4-butanediol, 1,5-pentanediol, 1,6-hexanediol, 1,9-nonanediol, neopentyl glycol, dimethylolheptane, dimethylolpentane, tricyclodecanedimethanol, ethylene oxide derivatives of bisphenol A, bisphenol S and bisphenol F, and the like. These glycols may be used in various combinations depending on the balance of the properties of the elastomer, provided that the crystallinity of the ester units (I) comprising cyclohexanedimethanol and an aromatic dicarboxylic acid is not impaired. Therefore, the amount of the glycol to be copolymerized preferably does not exceed 20 mole % of the whole glycol units.

The proportions of the ester units (II) and (III) are not limited, since they are contained in a suitable combination depending on the balance of the properties of the elastomer. The weight ratio of the ester units (II) to the total weight of the ester units (II) and the ester units (III) is from 0.01:1 to 0.99:1, preferably from 0.05:1 to 0.95:1, more preferably from 0.1:1 to 0.9:1. When this ratio is less than 0.01:1, the polymer lacks the elastic properties as an elastomer. When this ratio exceeds 0.99:1, the compatibility of the soft segments with the hard segments decreases, and thus the elastomer has the deteriorated elastic properties.

The thermoplastic polyester elastomer of the present invention may comprise a small amount of tri- or higher functional polycarboxylic acids or polyols. For example, trimellitic anhydride, benzophenonetetracarbocylic acid, trimethylolpropane, glycerin, pyromellitic anhydride and the like may be used in an amount of 3 mole % or less.

The thermoplastic polyester elastomer of the present invention may be prepared by any known methods. For example, melt polymerization, solution polymerization, solid state polymerization, and the like may be used. In the case of melt polymerization, either a transesterification method or a direct polymerization method can be used. It is desirable to carry out the solid state polymerization after the melt polymerization to increase the viscosity of the elastomer.

The polymerization is preferably carried out in the presence of a catalyst. Preferable examples of the catalyst are antimony catalysts, germanium catalysts, titanium catalysts, etc. Among them, the titanium catalysts, in particular, tetraalkyl titanates such as tetrabutyl titanate, tetramethyl titanate and the like, and oxalates such as titanium potassium oxalate and the like are preferable. Any other known catalysts maybe used. For example, tin compounds such as dibutyltin oxide, dibutyltin dilaurate and the like, and lead compounds such as lead acetate and the like may be used.

The reduced viscosity of the thermoplastic polyester elastomer of the present invention is usually from 0.5 to 4.0, preferably from 0.5 to 3.0, more preferably from 0.8 to 2.0. When the reduced viscosity is less than 0.5, the elastomer has deteriorated mechanical properties. The reduced viscosity exceeding 4.0 is not preferable since the elastomer has insufficient molding properties.

The lower limit of the melting point of the thermoplastic polyester elastomer of the present invention is not critical. In general, the melting point of the elastomer is preferably at least 200° C. When the elastomer is used in applications which require heat resistance, the melting point is preferably at least 200° C., in particular, at least 230° C. for the applications which require the significant heat resistance.

Adv. Chem. Ser., 176, 129 (1979) describes that a polyester elastomer consisting of polycyclohexanedimethylene terephthalate and polytetramethylene glycol causes the phase separation and does not exhibit elastic properties, if the content of polycyclohexanedimethylene terephthalate is 50 wt. % or more. Surprisingly, it has been found by the present inventors that an elastomer exhibits satisfactory elastic properties at a hard-segment content of 50 wt. % or more, when soft segments are changed from those consisting of a polyalkylene glycol to those of the combination of a polyalkylene glycol and a hydrogenated dimer diol or its derivative.

The thermoplastic polyester elastomer of the present invention may contain various additives in accordance with the purposes of the elastomer. Examples of the additives include antioxidants (e.g. hindered phenol-type, sulfur-type, phosphorus-type and amine-type antioxidants), light stabilizers (e.g. hindered amine-type, triazole-type, benzophenone-type, benzoate-type, nickel-type and salicylate-type light stabilizers), antistatic agents, lubricants, molecular weight adjusters (e.g. peroxides), compounds having reactive groups (e.g. epoxy compounds, isocyanate compounds and carbodiimide compounds), metal deactivators, organic and inorganic nucleating agents, neutralizers, antacids, bacteriocides, optical brightener, fillers, flame retardants, flame retarding aids, organic and inorganic pigments, and the like.

Hindered phenol-type antioxidants include 3,5-di-tert.-butyl-4-hydroxytoluene, n-octadecyl-β-(4'-hydroxy-3',5'-di-tert.-butylphenyl)propionate, tetrakis[methylene- 3-(3',5'-di-tert.-butyl-4'-hydroxyphenyl)propinate]methane, 1,3,5-trimethyl-2,4,6'-tris(3,5-di-tert.-butyl-4-hydroxybenzyl) benzene, calcium (3,5-di-tert.-butyl-4-hydroxybenzyl-monoethylphosphate), triethylene glycol bis[3-(3-tert.-butyl-5-methyl-4-hydroxyphenyl)propionate], pentaerithrityl-tetrakis[3-(3,5-di-tert.-butylanilino)-1,3,5-triazine, 3,9-bis[1,1-dimethyl-2-{β-(3-tert.-butyl-4-hydroxy-5-methylphenyl)propionyloxy}ethyl]2,4,8,10-tetrakisaspiro[5.5]undecane, bis[3,3-bis(4'-hydroxy-3'-tert.-butylphenyl]butyric acid] glycol ester, triphenol, 2,2'-ethylidenebis(4,6-di-tert.-butylphenol), N,N'-bis[3-(3,5-di-tert.-butyl-4-hydroxyphenyl)propionyl]hydrazine, 2,2'-oxamidebis[ethyl-3-(3,5-di-tert.-butyl-4-hydroxyphenyl) propionate], 1,1,3-tris(3',5'-di-tert.-butyl-4'-hydroxybenzyl)-S-triazine-2,4,6(1H,3H,5H)-trione, 1,3,5-tris(4-tert.-butyl-3-hydroxy-2,6-dimethylbenzyl)isocyanate, triester of 3,5-di-tert.-butyl-4-hydroxyhydrocynnamic acid with 1,3,5-tris(2-hydroxyethyl)-S-triazine-2,4,6(1H,3H,5H), N,N-hexamethylenebis(3,5-di-tert.-butyl-4-hydroxyhydrocynnamide), and the like.

The sulfur-type antioxidants include dilauryl 3,3'-thiodipropionate, dimyristyl 3,3'-thiodipropionate, distearyl 3,3'-thiodipropionate, lauryl stearyl 3,3'-thiodipropionate, dilauroyl thiodipropionate, dioctadecyl sulfide, pentaerithritol tetra(β-lauryl-thiopropionate), and the like.

The phosphorus-type antioxidants include tris(mixed, mono- and dinonylphenyl)phosphite, tris(2,3-di-tert.-butylphenyl)phosphite, 4,4'-butylidene-bis(3-methyl-6-tert.-butylphenyl-di-tridecyl)phosphite, 1,1,3-tris(2-methyl-4-di-tridecylphosphite-5-tert.-butylphenyl)butane, tris(2,4-di-tert.-butylphenyl)phosphite, bis(2,4-di-tert.-butylphenyl)pentaerithritol diphosphite, tetrakis(2,4-di-tert.-butylphenyl)-4,4'-biphenylene phosphite, bis(2,6-di-tert.-butyl-4-methylphenyl)pentaerithritol diphosphite, tetrakis(2,4-di-tert.-butylphenyl)-4,4'-biphenylene diphosphite, triphenyl phosphite, diphenyl decyl phosphite, tridecyl phosphite, trioctyl phosphite, tridecyl phosphite, trioctadecyl phosphite, trinonyl phenyl phosphite, tridecyl trihiophosphite, and the like.

The amine-type antioxidants include amines such as N,N-diphenylethylenediamine, N,N-diphenylacetamidine, N,N-diphenyl-p-phenylenediamine, N-phenylpiperidine, dibenzylethylene-diamine, triethanolamine, phenothiazine, N,N'-di-sec.-butyl-p-phenylenediamine, 4,4'-tetramethyldiaminodiphenylmethane, p,p'-dioctyldiphenylamine, N,N'-bis(1,4-dimethylpenty)-p-phenylenediamine, phenyl-α-naphthylamine, phenyl-β-naphthylamine, 4,4'-bis (4-α,α-dimethylbenzyl) diphenylamine, etc.; their derivatives; reaction products of such amines and aldehydes; and reaction products of such amines and ketones.

The hindered amine-type light stabilizers include polycondensates of succinic acid and dimethyl-1-(2-hydroxyethyl)-4-hydroxy-2,2,6,6-tetramethylpiperidinepoly [[6-(1,1,3,3-tetrabutyl)imino-1,3,5-triazine-2,4-diyl] hexamethylene[(2,2,6,6-tetramethyl-4-piperidyl)imyl]], bis (1,2,2,6,6-pentamethyl-4-piperidyl)ester of 2-n-butylmalonic acid, tetrakis (2,2,6,6-tetramethyl-4-piperidiyl) 1,2,3,4-butanetetracarboxylate, bis(2,2,6,6-tetramethyl-4-piperidyl)sebacate, polycondensates of N,N'-bis(2,2,6,6-tetramethyl-4-piperidyl)hexamethylenediamine and 1,2-dibromoethane, poly[(N,N'-bis(2,2,6,6,-tetramethyl-4-piperidyl)hexamethylenediamine)-(4-morpholino-1,3,5-triazin-2,6-diyl)-bis(3,3,5,5-tetramethylpiperazinone)], tris(2,2,6,6-tetramethyl-4-piperidyl)dodecyl 1,2,3,4-butanetetracarboxylate, tris(1,2,2,6,6-pentamethyl-4-piperidyl)dodecyl 1,2,3,4-butanetetracarboxylate, bis(1,2,2,6,6-pentamethyl-4-piperidyl)sebacate, 1,6,11-tris[4,6-bis(N-butyl-N-(1,2,2,6,6-pentamethylpiperidin-4-yl)amino-1,3,5-triazin-2-yl)amino] undecane, 1-[2-(3,5-di-tert.-butyl-4-hydroxyphenyl) propionyloxy]-2,2,6,6-tetramethylpiperidine, 8-benzyl-7,7,9,9-tetramethyl-3-octyl-1,3,8-triazabicyclo[4.5]undecan-2,4-dione, 4-benzoyloxy-2,2,6,6-tetramethylpiperidine, condensates of N,N'-bis(3-aminoproyl)ethylenediamine-2,4-bis[N-butyl-N-(1,2,2,6,6-pentamethyl-4-piperidyl)amino]-6-chloro-1,3,5-triazine, and the like.

The benzophenone-type, benzotriazole-type, triazole-type, nickel-type and salicylate type light stabilizers include 2,2'-dihydroxy-4-methoxybenzophenone, 2-hydroxy-4-n-octoxybenzophenone, p-tert.-butylphenyl salicylate, 2,4-di-tert.-butylphenyl 3,5-di-tert.-butyl-4-hydroxybenzoate, 2-(2'-hydroxy-5'-methylphenyl)benzotriazole, 2-(2'-hydroxy-3',5'-di-tert.-amylphenyl)benzotriazole, 2-[2'-hydroxy-3',5'-bis(α,α-dimethylbenzylphenyl)benzotriazole, 2-(2'-hydroxy-3'-tert.-butyl-5'-methylphenyl)-5-chlorobenzotriazole, 2-(2'-hydroxy-3',5'-di-tert.-butylphenyl)-5-chlorobenzotriazole, 2,5-bis-[5'-tert.-butylbenzoxazolyl-(2)]thiophene, the nickel salt of bis (monoethyl 3,5-di-tert.-butyl-4-hydroxybenzylphosphate), mixtures of 85 to 90 wt. % of 2-ethoxy-5-tert.-butyl-2'-ethyloxalic acid bisanilide and 10 to 15 wt. % of 2-ethoxy-5-tert.-butyl-2'-ethyl-4'-butyloxalic acid bisanilide, 2-[2-hydroxy-3,5-bis(α,α-dimethylbenzyl)phenyl]-2H-benzotriazole, 2-ethoxy-2'-ethyloxalic acid bisanilide, 2-[2'-hydroxy-5'-methyl-3'-(3",4",5",6"-tetrahydrophthalimidemethyl)phenyl]-benzotriazole, bis(5-benzoyl-4-hydroxy-2-methoxyphenyl)-methane, 2-(2'-hydroxy-5'-tert.-octylphenyl)benzotriazole, 2-hydroxyl-4-isooctoxybenzophenone, 2-hydroxy-4-dodecyloxybenzophenone, 2-hydroxy-4-octadecyloxybenzophenone, phenyl salicylate, and the like.

The lubricants include hydrocarbons, fatty acids, fatty acid amides, esters, alcohols, metal soaps, natural and synthetic waxes, silicones, fluorine-containing compounds, and the like. Specific examples of the lubricants are liquid paraffin, synthetic paraffin, synthetic hard paraffin, synthetic isoparaffinic petroleum hydrocarbon, chlorinated paraffin, paraffin wax, microwax, low molecular weight polyethylene, fluorocarbon oil, fatty acids having at least 12 carbon atoms (e.g. lauric acid, myristic acid, palmitic acid, stearic acid, arachidonic acid, behenic acid, etc.), saturated or unsaturated fatty acid amides having 3 to 30 carbon atoms and their derivatives (e.g. hexylamide, octylamide, stearylamide, palmitylamide, oleylamide, erucylamide, ethylenebisstearylamide, methylenebisstearylamide, laurylamide, behenylamide, ricinolamide, etc.), lower alcohol esters of fatty acids, polyalcohol esters of fatty acids, polyglycol esters of fatty acids, fatty alcohol esters of fatty acids (e.g. butyl stearate, hardened castor oil, ethylene glycol monostearate, etc.), cetyl alcohol, ethylene glycol, polyethylene glycol having a molecular weight of 200 to 10,000, polyglycerol, carnauba wax, candelilla wax, montan wax, dimethylsilicone, silicone gum, polytetrafluoroethylene, and the like. Furthermore, metal soaps comprising salts of a metal (e.g. Li, Mg, Ca, Sr, Ba, Ze, Cd, Al, Sn, Pb, etc.) with straight saturated fatty acids, branched acids, ricinoleic acid and the like.

The fillers include oxides (e.g. magnesium oxide, aluminum oxide, silicon oxide, calcium oxide, rutile or anatase titanium oxide, chromium (III) oxide, iron oxide, zinc oxide, silica, diatomaceous earth, alumina fiber, antimony oxide, barium ferrite, strontium ferrite, beryllium oxide, pumicite, pumicite balloons, etc.), basic compounds or hydroxides (e.g. magnesium hydroxide, aluminum hydroxide, basic magnesium carbonate, etc.), carbonates (e.g. magnesium carbonate, calcium carbonate, barium carbonate, ammonium carbonate, dolomite, dawsonaite, etc.), sulfates and sulfites (e.g. calcium sulfate, barium sulfate, ammonium sulfate, calcium sulfite, basic magnesium sulfate, etc.), silicates (e.g. sodium silicates, magnesium silicates, aluminum silicates, potassium silicates, calcium silicates, talc, clay, mica, asbestos, glass fiber, glass balloons, glass beads, montmorillonite, bentonite, etc.), kaolin, perlite, metal powders (e.g. iron powder, copper powder, lead powder, aluminum powder, tungsten powder, etc.), molybdenum sulfide, carbon black, boron fiber, silicon carbide fiber, bronze fiber, potassium titanate, lead titanate zirconate, borates (e.g. zinc borate, aluminum borate, barium metaborate, calcium borate, sodium borate, etc.), and the like.

The compounds having epoxy groups include polyepoxy compounds (e.g. sorbitol polyglycidyl ether, polyglycerol polyglycidyl ether, triglycidyl tris(2-hydroxyethyl) isocyanurate, etc.), diepoxy compounds (e.g. diethylene glycol diglycidyl ether, polyethylene glycol diglycidyl ether, polypropylene glycol diglycidyl ether, polytetramethylene glycol diglycidyl ether, neopentyl glycol diglycidyl ether, 1,6-hexanediol diglycidyl ether, diglycidyl hexahydrophthalate, condensates of epichlorohydrin with bisphenol A, bisphenol F or bisphenol S, etc.), and monoepoxy compounds (e.g. higher alcohol glycidyl ether, butyl glycidyl ether, allyl glycidyl ether, stearyl glycidyl ether, methyl glycidyl ether, phenyl glycidyl ether, glycidyl methacrylate, p-tert.-butylphenyl glycidyl ether, etc.).

The flame retardants can be compounds having a halogen-substituted phenyl group, such as tetrabromobisphenol A (TBA), tetrabromobisphenol S (TBS), bis(dibromopropyl) tetrabromobisphenol A ether, epoxyTBA, TBA ethyl ether oligomer, TBA bis(2,3-dibromopopyl)ether, TBA allyl ether, TBA bis(2,3-dibromopropyl)ether, TBA carbonate oligomers, TBA bis(2,3-dibromoproyyl)ether, hexabromobenzene, tetrabromophthalic anhydride, decabromodiphenyleneoxide, tris(tribromophenoxy) triazine, bis(pentabromophenyl)ethane, bis(tribromophenoxy)ethane, bis(pentabromophenoxy)ethane, brominated phenoxy, ethylenebis(tetrabromo)imide, brominated diphenyloxide, brominated polystyrene, and the like.

The flame retarding aids include antimony trioxide, antimony tetraoxide, antimony pentaoxide, sodium pyroantimonate, tin dioxide, zinc metaborate, aluminum hydroxide, magnesium hydroxide, zirconium oxide, molybdenum oxide, red phosphorus compounds, ammonium polyphosphate, melamine cyanurate, tetrafluoroethylene, and the like.

The compounds having a triazine group or their derivatives, which are used as flame retardants, include melamine, melamine cyanurate, melamine phosphate, guanidine sulfamate, and the like.

The flame retardants may be inorganic or organic phosphorus compounds.

The inorganic phosphorus compounds include red phosphorus compounds, ammonium polyphosphate, and the like. Examples of the red phosphorus compounds are resin-coated red phosphorus, complex compounds of red phosphorus and aluminum, etc.

The organic phosphorus compounds includes phosphate esters, melamine phosphates, and the like. Preferable examples of phosphate esters are phosphates, phosphonates and phosphites, such as trimethyl phosphate, triethyl phosphate, tributyl phosphate, trioctyl phosphate, trioctyl phosphite, tributoxyethyl phosphate, octyldiphenyl phosphate, tricresyl phosphate, cresyl diphenyl phosphate, triphenyl phosphate, trixylenyl phosphate, tris-isopropylphenyl phosphate, diethyl N,N-bis(2-hydroxyethyl)aminomethylphosphonate, bis(1,3-phenylenediphenyl)phosphate, and aromatic condensed phosphate esters such as 1,3-[bis(2,6-dimethylphenoxy)phosphenyloxy]benzene and 1,4-[bis(2,6-dimethylphenoxy)phosphenyloxy]benzene, in view of good resistance to hydrolysis, heat resistance and flame retardance.

These additives may be compounded with the thermoplastic elastomer using any conventional kneading machines such as heated rolls, extruders, mixers such as Banbury mixers, etc. Alternatively, the additives may be added to the polymer prior to the transesterification to prepare the thermoplastic polyester elastomer of the present invention, or to an oligomer prior to the polycondensation reaction.

EXAMPLES

The present invention will be illustrated by the following Examples, which will not limit the scope of the invention in any way.

In the Examples, properties were measured as follows:

1) Weight percentages of polycyclohexanedimethylene terephthalate, polytetramethylene glycol and the like were measured by proton ($^1$H) NMR.

2) Reduced viscosity

The reduced viscosity of a polymer was measured using an Ostwald's viscometer at 30° C. with the solution of a polymer (0.05 g) dissolved in 25 ml of a mixed solvent of phenol and tetrachloroethane in a volume ratio of 60:40.

3) Melting point and Crystallization point

The melting point of a polymer was measured with DSC by heating a polymer sample from room temperature at a heating rate of 20° C./min.

The crystallization point was measured by heating a polymer sample from room temperature to a temperature, which was about 20° C. higher than the melting point of the polymer, at a heating rate of 20° C./min., maintaining the molten sample at that temperature for 2 minutes, and cooling the sample at a cooling rate of 10° C./min.

4) Vicat softening point

The Vicat softening point of a polymer was measured according to ASTM D1525.

5) Surface hardness

The surface hardness of a polymer was measured according to ASTM D2240.

6) Flexural modulus

The flexural modulus of a polymer was measured according to ASTM D790.

7) Tensile modulus and Tensile elongation

The tensile modulus and tensile elongation of a polymer were measured according to ASTM D638.

8) Weather resistance

The strength retention of a polymer sample was measured after the irradiation with a fadeometer at 63° C. for 500 hours according to ASTM D638.

9) Water resistance

The strength retention of a polymer sample was measured after the treatment of the sample with water at 100° C. for one week.

Example 1

Dimethyl terephthalate (460 wt. parts), cyclohexanedimethanol (450 wt. parts), hydrogenated dimer diol (HP 1000 (trade name) manufactured by TOAGOSEI Co., Ltd.) (100 wt. parts), polytetramethylene glycol having a molecular weight of 1000 (250 wt. parts), IRGANOX 1330 (distributed by NIPPON Ciba-Geigy Co., Ltd.) (2 wt. parts) and tetrabutyl titanate (0.9 wt. part) were charged in a reactor and heated from room temperature to 260° C. over 2 hours, and maintained at 260° C. for one hour to effect a transesterification reaction.

Then, the reactor was heated up to 275° C. over 45 minutes while gradually evacuating the reactor to less than 1 Torr. to carry out an initial condensation reaction. Furthermore, the polymerization reaction was continued at 275° C. under a pressure of 1 Torr. or less for 4 hours, and the polymer was removed from the reactor in the form of pellets.

The polymer had a reduced viscosity of 1.03. The contents of the polycyclohexanedimethylene terephthalate component, the polytetramethylene glycol component, and the hydrogenated dimer diol component were 65 wt. %, 25 wt. % and 10 wt. %, respectively.

The results of the measurements of the properties of the obtained polymer are shown in the Table.

Example 2

A thermoplastic elastomer was prepared in the same manner as in Example 1 except that the amounts of charged compounds were selected so that the contents of the polycyclohexanedimethylene terephthalate component, the polytetramethylene glycol component, and the hydrogenated dimer diol component were 75 wt. %, 17 wt. % and 8 wt. %, respectively, and the reaction temperatures were suitably adjusted.

The results of the measurements of the properties of the obtained polymer are shown in the Table.

Example 3

A thermoplastic elastomer was prepared in the same manner as in Example 1 except that the amounts of charged compounds were selected so that the contents of the polycyclohexanedimethylene terephthalate component, the polytetramethylene glycol component, and the hydrogenated dimer diol component were 55 wt. 30 wt. % and 15 wt. %, respectively, and the reaction temperatures were suitably adjusted.

The results of the measurements of the properties of the obtained polymer are shown in the Table.

Comparative Example 1

A thermoplastic elastomer was prepared in the same manner as in Example 1 except that polybutylene terephthalate and polytetramethylene glycol were used but no hydrogenated dimer diol was used, so that the contents of the polybutylene terephthalate component and the polytetramethylene glycol component were 65 wt. % and 35 wt. %, respectively, and the reaction temperatures were suitably adjusted.

The results of the measurements of the properties of the obtained polymer are shown in the Table.

As can be seen from the results in the Table, the obtained polymer in this Comparative Example had a very low melting point while it had a sufficient tensile elongation. In addition, this polymer had low weather resistance and water resistance.

Comparative Example 2

A thermoplastic elastomer was prepared in the same manner as in Example 1 except that polycyclohexanedimethylene terephthalate and polytetramethylene glycol were used but no hydrogenated diner diol was used, so that the contents of the polycyclohexanedimethylene terephthalate component and the polytetramethylene glycol component were 65 wt. % and 35 wt. %, respectively, and the reaction temperatures were suitably adjusted.

The results of the measurements of the properties of the obtained polymer are shown in the Table.

As can be seen from the results in the Table, the obtained polymer in this Comparative Example had insufficient tensile strength and tensile elongation.

Comparative Example 3

A thermoplastic elastomer was prepared in the same manner as in Example 1 except that polycyclohexanedimethylene terephthalate and hydrogenated diner diol were used but no polytetramethylene glycol was used, so that the contents of the polycyclohexanedimethylene terephthalate component and the hydrogenated dimer diol component were 65 wt. % and 35 wt. %, respectively, and the reaction temperatures were suitably adjusted.

The results of the measurements of the properties of the obtained polymer are shown in the Table.

As can be seen from the results in the Table, the obtained polymer in this Comparative Example had insufficient tensile elongation. Furthermore, its melting point was lower than that of the elastomer of Example 1 which had substantially the same elastic modulus.

TABLE

|  | Ex. 1 | Ex. 2 | Ex. 3 | C. Ex. 1 | C. Ex. 2 | C. Ex. 3 |
|---|---|---|---|---|---|---|
| Reduced viscosity (dl/g) | 1.03 | 1.10 | 1.00 | 1.49 | 0.92 | 1.07 |
| Surface hardness (Shore-D) | 57 | 62 | 45 | 55 | 54 | 62 |
| Fiexural modulus (kg/cm$^2$) | 1700 | 3000 | 940 | 1650 | 1620 | 1900 |
| Tensile strength (kg/cm$^2$) | 250 | 330 | 220 | 310 | 115 | 230 |
| Tensile elongation (%) | 450 | 400 | 480 | 550 | 100 | 110 |
| Melting point (° C.) | 260 | 270 | 208 | 203 | 264 | 233 |
| Crystallization point (° C.) | 221 | 231 | 178 | 163 | 228 | 185 |
| Weather resistance (%) | 70 | 77 | 70 | 22 | 66 | 72 |
| Water resistance (%) | 75 | 80 | 68 | 50 | 60 | 85 |
| Vicat softening point (° C.) | 221 | 231 | 178 | 163 | 228 | 185 |
| Elongation at break (%) | | | | | | |

What is claimed is:

1. A thermoplastic polyester elastomer having a crystalline melting point which satisfies the relationship of the following formula (1), a Vicat softening point which satisfies the relationship of the following formula (2), and a tensile elongation of at least 100% which is measured according to ASTM D638

$$\text{Crystalline melting point: } y \geq 200 + 0.5x \tag{1}$$

$$\text{Vicat softening point: } z \geq 50 + 1.5x \tag{2}$$

in which x is a weight percentage of polymeric units which substantially constitute hard segments of the elastomer;

y is a crystalline melting point (°C.) measured with a differential scanning calorimeter (DSC) by raising a temperature from a room temperature at a heating rate of 20° C./min.; and z is a Vicat softening point (°C.) measured according to ASTM D1525.

2. A thermoplastic polyester elastomer according to claim 1, wherein said crystalline melting point y satisfies the relationship of the formula:

$$y \geq 200 + 0.55x \qquad (1').$$

3. A thermoplastic polyester elastomer according to claim 1, wherein said Vicat softening point z satisfies the relationship of the formula:

$$z \geq 50 + 1.7x \qquad (2').$$

4. A thermoplastic polyester elastomer according to claim 1, wherein x is from 30 to 90.

5. A thermoplastic polyester elastomer according to claim 1, which comprises hard segments consisting of repeating units of the general formula (I):

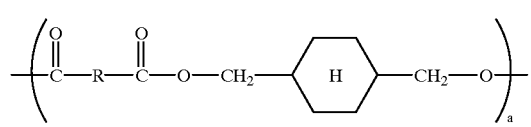
(I)

wherein R is an aromatic group having 6 to 18 carbon atoms, and a represents a weight percentage of said repeating units in the whole polymer and is from 30 to 95 wt. %.

6. A thermoplastic polyester elastomer comprising repeating units of the general formulas (I), (II), (III) and (IV):

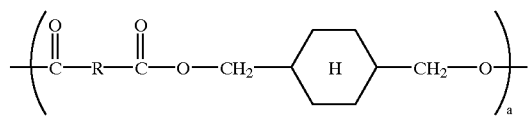
(I)

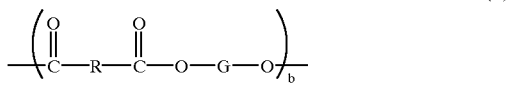
(II)

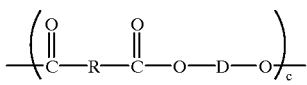
(III)

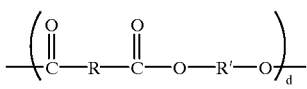
(IV)

wherein

R is an aromatic group having 6 to 18 carbon atoms, provided that the R groups in the general formulas (I), (II), (III) and (IV) may be the same or different;

G is a polyoxyalkylene group having a molecular weight of from 400 to 6000;

D is a residue of a hydrogenated dimer diol or its derivative;

R' is an alkylene group having 1 to 25 carbon atoms;

a, b and c represent weight percentages of the respective repeating units in the whole polymer, provided that a is from 30 to 95 wt. %, and the ratio of b to the sum of b and c is from 0.01:1 to 0.99:1; and d is a molar percentage in the whole polymer and from 0 to 20 mole %.

7. A composition comprising a thermoplastic polyester elastomer as claimed in any one of claims 1 to 6, and at least one additive selected from the group consisting of antioxidants, light stabilizers, lubricants, fillers, compounds having at least one epoxy group, compounds having a phenyl group which is substituted with at least one halogen atom, flame retarding aids, and compounds having a triazine group and derivatives thereof.

* * * * *